United States Patent [19]
Sai et al.

[11] Patent Number: 5,880,376
[45] Date of Patent: Mar. 9, 1999

[54] ELECTROMAGNETIC FLOWMETER

[75] Inventors: Yukio Sai, Tokorozawa; Yousuke Kubota, Tokyo, both of Japan

[73] Assignee: Kabushiki Kaisha Toshiba, Kawasaki, Japan

[21] Appl. No.: 937,595

[22] Filed: Sep. 29, 1997

Related U.S. Application Data

[63] Continuation of Ser. No. 734,264, Oct. 21, 1996, abandoned.

[30] Foreign Application Priority Data

Oct. 26, 1995 [JP] Japan .................................. 7-279023

[51] Int. Cl.$^6$ ...................................................... G01F 1/56
[52] U.S. Cl. ......................................................... 73/861.08
[58] Field of Search ........................... 73/861.08, 861.12, 73/861.16, 861.17

[56] References Cited

U.S. PATENT DOCUMENTS

| | | | |
|---|---|---|---|
| 4,059,014 | 11/1977 | Torimaru | 73/861.16 |
| 4,206,641 | 6/1980 | Takada | 73/861.17 |
| 4,290,312 | 9/1981 | Kobayshi | 73/861.12 |
| 4,339,958 | 7/1982 | Shauger | 73/861.17 |
| 5,301,556 | 4/1994 | Nissen et al. | 73/861.16 X |
| 5,325,724 | 7/1994 | Kiene et al. | 73/861.12 X |
| 5,327,787 | 7/1994 | Kiene et al. | 73/861.12 |
| 5,369,999 | 12/1994 | Yoshida | 73/861.12 |
| 5,375,475 | 12/1994 | Kiene et al. | 73/861.12 X |
| 5,499,543 | 3/1996 | Nissen et al. | 73/861.16 |
| 5,524,493 | 6/1996 | Yoshida | 73/861.16 X |

FOREIGN PATENT DOCUMENTS

| | | |
|---|---|---|
| 2063792 | 7/1972 | Germany . |
| 3018260 | 11/1981 | Germany . |
| 91 03 046 U | 6/1991 | Germany . |
| 0278715 | 12/1986 | Japan . |
| 2064130 | 6/1981 | United Kingdom . |

OTHER PUBLICATIONS

"Magmeter Measures Flow In Partially Filled Pipes," Charles Rose et al. InTech; Apr. 1995. pp. 58–61.

Charles Rose, et al., "New Developments in Flow Measurements: Magmeters for Partially–Filled Pipelines", ISA, 1994—Paper 494–506, pp. 581–606 No Month.

*Primary Examiner*—Harshad Patel
*Assistant Examiner*—Jewel V. Thompson
*Attorney, Agent, or Firm*—Oblon, Spivak, McClelland, Maier & Neustadt, P.C.

[57] ABSTRACT

An electromagnetic flowmeter generates a magnetic filed perpendicular to a ring earth electrode contacting fluid at an end portion of a measuring tube and a point electrode attached to a lower portion of the measuring tube so as to measure a flow rate without depending on a fluid level. The electromagnetic flowmeter comprises magnetic field generation means for generating the magnetic field in the measuring tube to be perpendicular to an axial direction of the measuring tube such that electromotive force generated in fluid is not influenced by the fluid level, flow rate output means for calculating a flow rate of fluid flowing in the measuring tube based on a potential developed in the fluid by said magnetic filed generated by the magnetic field generation means so as to output the calculated flow rate, and display means for displaying the flow rate calculated by the flow rate calculation means.

9 Claims, 6 Drawing Sheets

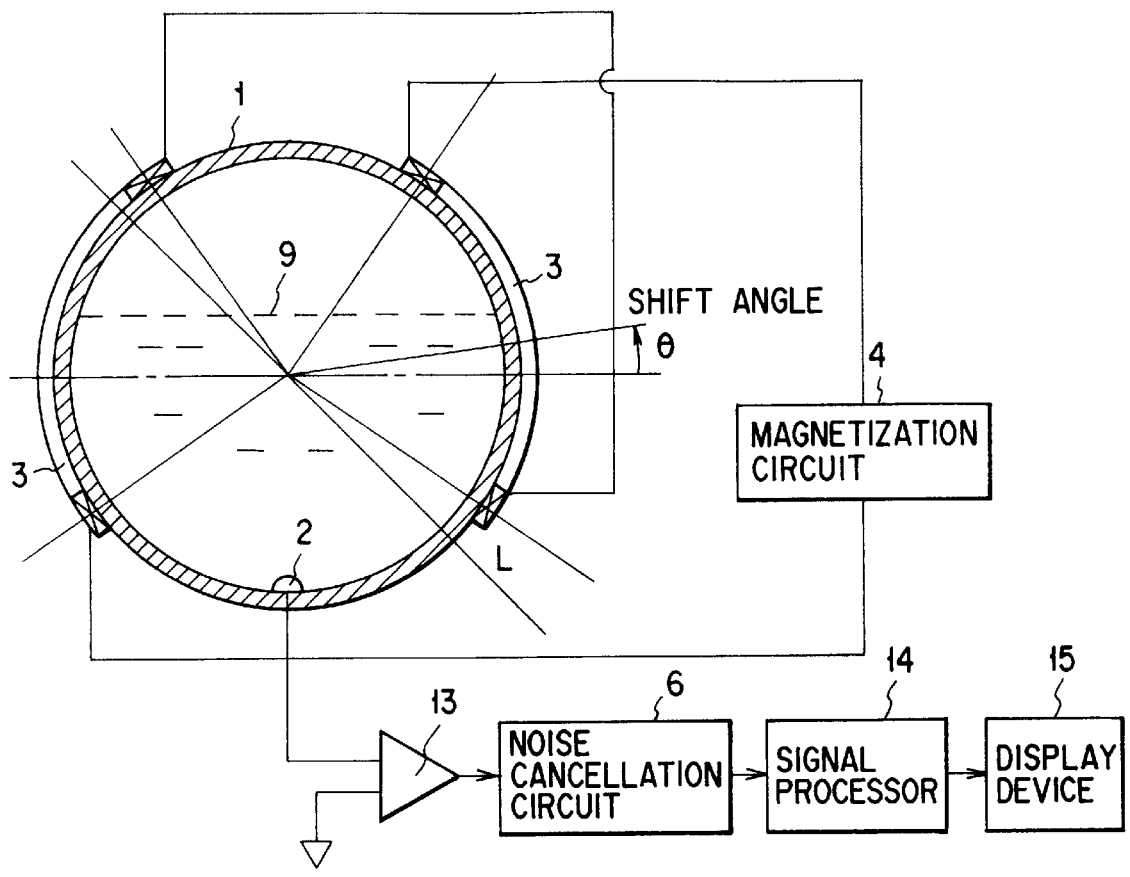
F I G. 3
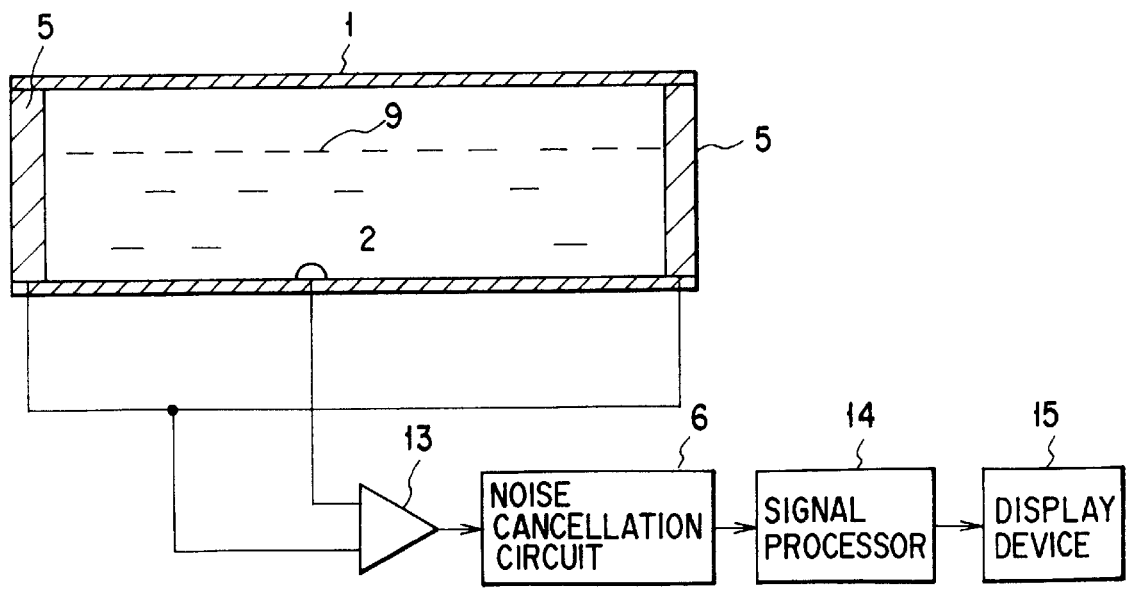
F I G. 4

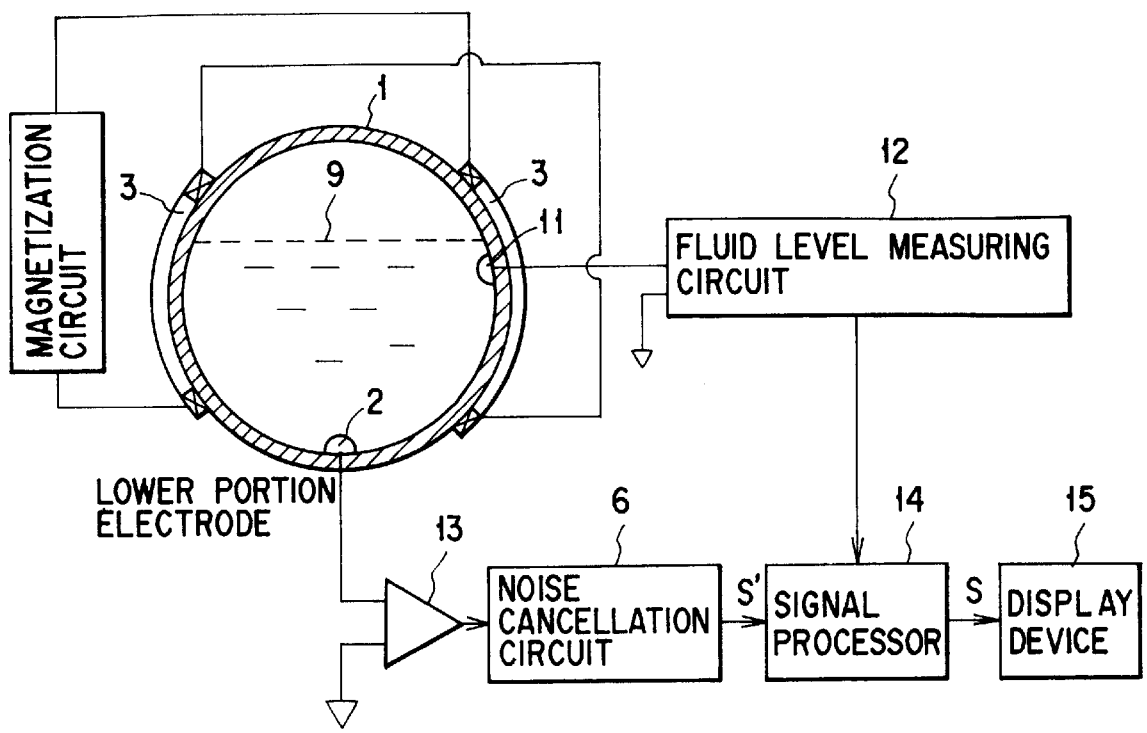
F I G. 5
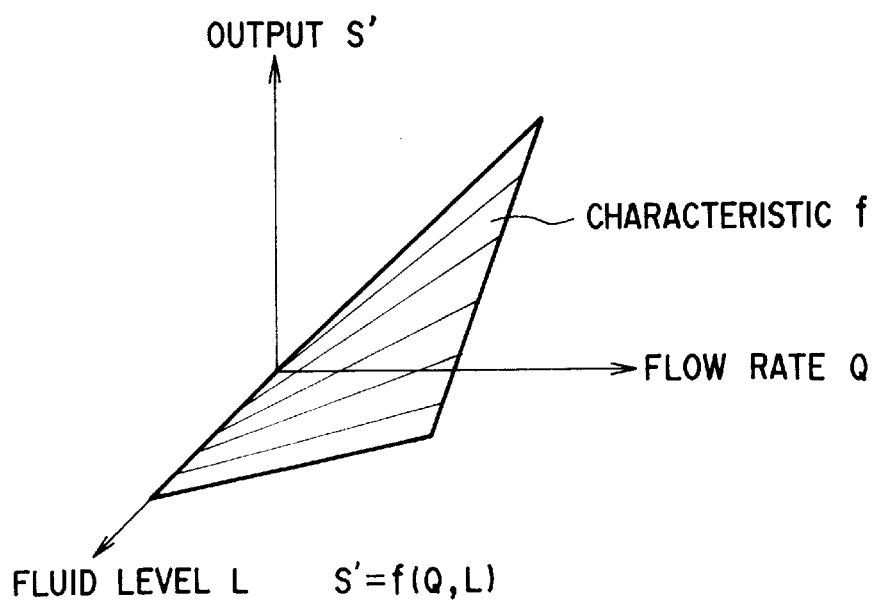
F I G. 6

ELECTROMAGNETIC FLOWMETER

This is a continuation of application Ser. No. 08/734,264, filed on Oct. 21, 1996, now abandoned.

BACKGROUND OF THE INVENTION

1. Field of the Invention

The present invention relates to an electromagnetic flowmeter for measuring a flow rate of fluid flowing in a flow tube in a non-filling state.

2. Description of the Related Art

An electromagnetic flowmeter applies a magnetic field which is perpendicular to the axis of a tube. As an electrically conductive fluid flows through the tube, an electromotive force is generated. The electromotive force is detected by two electrodes arranged in the tube. The flow rate of the fluid is calculated from the electromotive force thus detected.

Generally, a position of the electrodes is selected suitably so that the electromotive force thus detected is proportional to the flow rate. More specifically, the electrodes are arranged symmetrically with respect to a line of the axis of the tube. Since the electrodes are so arranged, the influence with respect to the inter-electrode electromotive force (i.e., a combination of electromotive forces generated at various parts of the fluid) is minimized when the tube is filled up with the fluid.

The electromotive force generated when the electrodes are appropriately positioned is given as follows:

$$e = \frac{2}{\pi a} \int WBv\,dx\,dy \quad (1)$$

where

W: weight function of the influence on the inter-electrode electromotive force, x, y: coordinates of the surface which is perpendicular to the axis of the tube, B: magnetic flux density, v: flow velocity.

The equation (1) shows the weight function W has a good symmetry. This means that magnetic field is distributed uniformly in an ideal laminar flow of the fluid, making no errors in measuring the flow rate.

In practice, the flowing fluid does not always fill up the tube. Even if the fluid flows in a non-filling state, the conventional flowmeter in which the electrodes are immersed in the flowing fluid can measure the flow rate of the fluid. However, the weight function W greatly differs in shape from the weight function detected when the fluid flows in the filling state. The weight function W has but a poor symmetry. The poor symmetry means changes in distribution of flow rate in the tube, which result in errors in measuring the flow rate.

Moreover, the electrodes are arranged at the position corresponding to the height of the center of the flow tube. Due to this, when the level of fluid flowing in the flow tube is 50% or less, the electrodes are exposed from fluid. As a result, electromotive force cannot be measured.

To solve the above problems, the following electromagnetic flowmeter is proposed.

Specifically, in the proposed electromagnetic flowmeter, a magnetic filed is generated to be perpendicular to a ring earth electrode and a point electrode, thereby measuring electromotive force of an electrode tube. In this case, the ring earth electrode contacts fluid at an end portion of the tube, and the point electrode is attached to a lower portion of the tube.

However, in such an electromagnetic flowmeter, electromotive force strongly depended on the fluid level. This was a cause that the flow rate error occurred in measuring the flow rate. Also, measures against dependence on the fluid level in electromotive force were not fully taken.

SUMMARY OF THE INVENTION

An object of the present invention is to provide an electromagnetic flowmeter, which generates a magnetic filed perpendicular to a ring earth electrode contacting fluid at an end portion of a measuring tube and a point electrode attached to a lower portion of the measuring tube so as to correctly measure a flow rate without depending on a fluid level.

To attain the above object, according to a first aspect of the present invention, there is provided an electromagnetic flowmeter comprising:

flow rate calculation means for calculating a flow rate of fluid without depending on a level of fluid flowing in a measuring tube; and display means for displaying the flow rate calculated by the flow rate calculation means.

According to the above-mentioned structure, the flow rate of fluid can be calculated by flow rate calculation means without depending on the level of fluid flowing in the measuring tube. Therefore, the flow rate of fluid flowing in the measuring tube in the non-filling state can be correctly measured.

According to a second aspect of the present invention, the flow rate calculation means of the electromagnetic flowmeter comprises:

magnetic field generation means for generating a magnetic field in the measuring tube to be perpendicular to an axial direction of the measuring tube such that electromotive force generated in the fluid is not influenced by the fluid level; and flow rate output means for calculating the flow rate of fluid flowing in the measuring tube based on a potential developed in the fluid by the magnetic filed generated by the magnetic field generation means so as to output the calculated flow rate to the display means.

According to the above-mentioned structure, the magnetic field can be generated in the measuring tube to be perpendicular to the axial direction of the measuring tube such that electromotive force generated in the fluid is not influenced by the fluid level. Therefore, the flow rate of fluid flowing in the measuring tube in the non-filling state can be correctly measured.

According to a third aspect of the present invention, the flow rate calculation means of electromagnetic flowmeter comprises:

magnetic field generation means for generating a magnetic field to be perpendicular to an axial direction of the measuring tube in the measuring tube; and flow rate output means for calculating a flow rate of fluid flowing in the measuring tube based on a potential developed in the fluid by the magnetic filed generated by the magnetic field generation means and the level of fluid flowing in the measuring tube so as to output the calculated flow rate to the display means.

According to the above-mentioned structure, flow rate output means can calculate the flow rate of fluid flowing in the measuring tube based on the potential developed in the fluid by the magnetic filed generated by the magnetic field generation means and the level of fluid flowing in the measuring tube so as to output the calculated flow rate to the display means. Therefore, the flow rate of fluid flowing in the measuring tube in the non-filling state can be correctly measured.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 3 is a schematic view showing the structure of an electromagnetic flowmeter of a first embodiment of the present invention;

FIG. 4 is a view showing an earth ring, which is attached to an end portion of a measuring tube;

FIG. 5 is a schematic view showing the structure of an electromagnetic flowmeter of a second embodiment of the present invention;

FIG. 6 is a view showing a characteristic function f;

DETAILED DESCRIPTION OF THE PREFERRED EMBODIMENTS

First of all, dependence on a fluid level in electromotive force will be explained. In a characteristic equation of an electromagnetic flowmeter, conductivity of fluid to be measured is low in many cases, and magnetic Reynolds number is small. As a result, the effect of an eddy current can be ignored. Due to this, a fluid equation and an electromagnetic characteristic equation can be separately reviewed.

The electromagnetic equation can be provided by a simultaneous equation of Maxwell equation and general Ohm's law. Then, a partial differential equation obtained by the simultaneous equation can be expressed as follows:

$$\nabla^2 \phi = \nabla \cdot (\mathbf{v} \times \mathbf{B}) \tag{2}$$

wherein $\phi$: scalar potential, v: flow velocity, B: magnetic flux density.

The partial differential equation may be solved by solving Poisson equation wherein $\mathbf{v} \times \mathbf{B}$ is used as a source. There is known a calculus of finite differences using a network as a solution of Poisson equation.

As disclosed in Fields and Waves in Communication Electronics SIMON RAMO etc., John Wiloy & Sons, 1965, Poisson equation is approximated to the following equation (3) by the calculus of finite differences:

$$\nabla^2 \phi \approx \frac{1}{h^2} \{ (\phi(x+h,y) + \phi(x-h,y) + \phi(x,y+h) + \phi(x,y-h) - 4\phi(x,y) \tag{3}$$

wherein in h is a minute length.

If equation (3) is deformed, the following equation (4) can be obtained:

$$\nabla^2 \phi \approx \frac{1}{h^2} \{ [\phi(x+h,y) - \phi(x,y)] + [\phi(x-h,y) - \phi(x,y)] + [\phi(x,y+h) - \phi(x,y)] + [\phi(x,y-h) - \phi(x,y)] \} \tag{4}$$

Equation (4) is the same as the first law of Kirchhoff in the coordinates (x, y), thereby, partial differential equation (2) can replace equivalent circuit (network model).

Figures 1A, 1B:
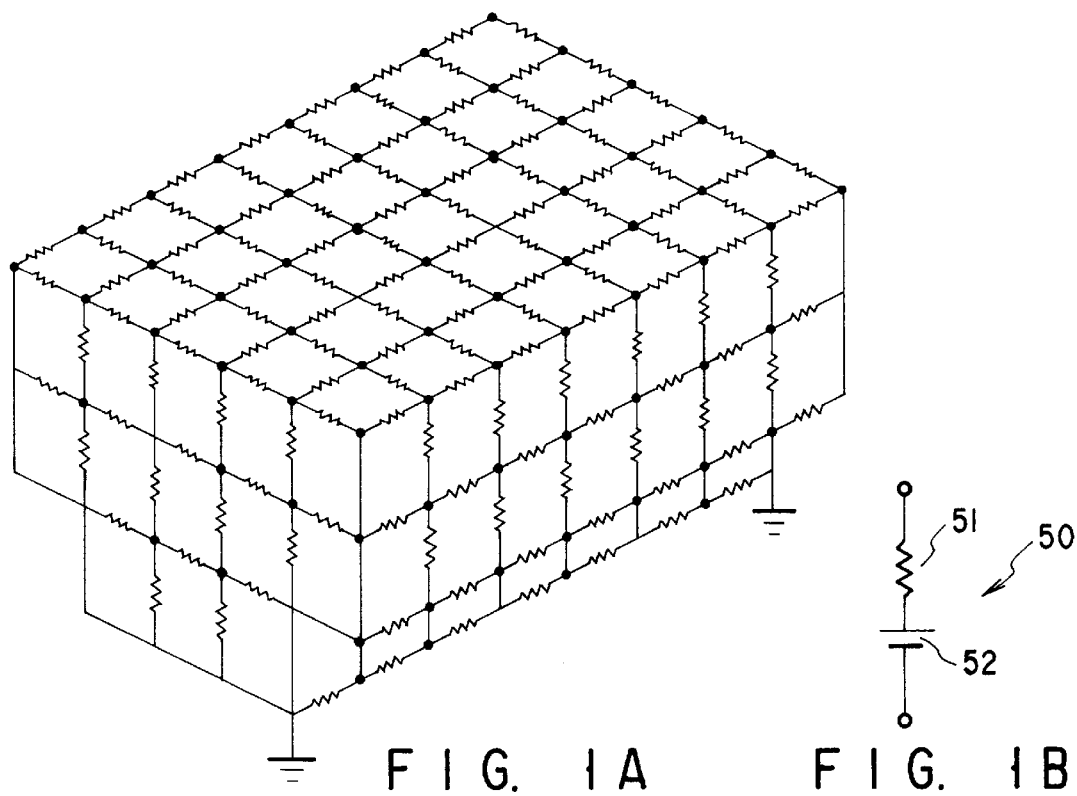
FIG. 1A is a view showing an outline of a network model of an electromagnetic flowmeter.
FIG. 1B is a model view showing fluid elements.

FIG. 1A shows a network model of an electromagnetic flowmeter, which generates a magnetic field in a measuring tube to be perpendicular to an axial direction of the measuring tube. Thereby, electromotive force, which is generated between a ring earth electrode and a point electrode, is measured. The ring earth electrode contacts fluid at an end portion of the measuring tube. The point electrode is attached to a lower portion of the measuring tube.

FIG. 1B shows a model view of fluid elements. In FIG. 1B, reference numeral 50 denotes the fluid element, 51: electrical resistance of fluid, and 52: electromotive force.

Figure 2:
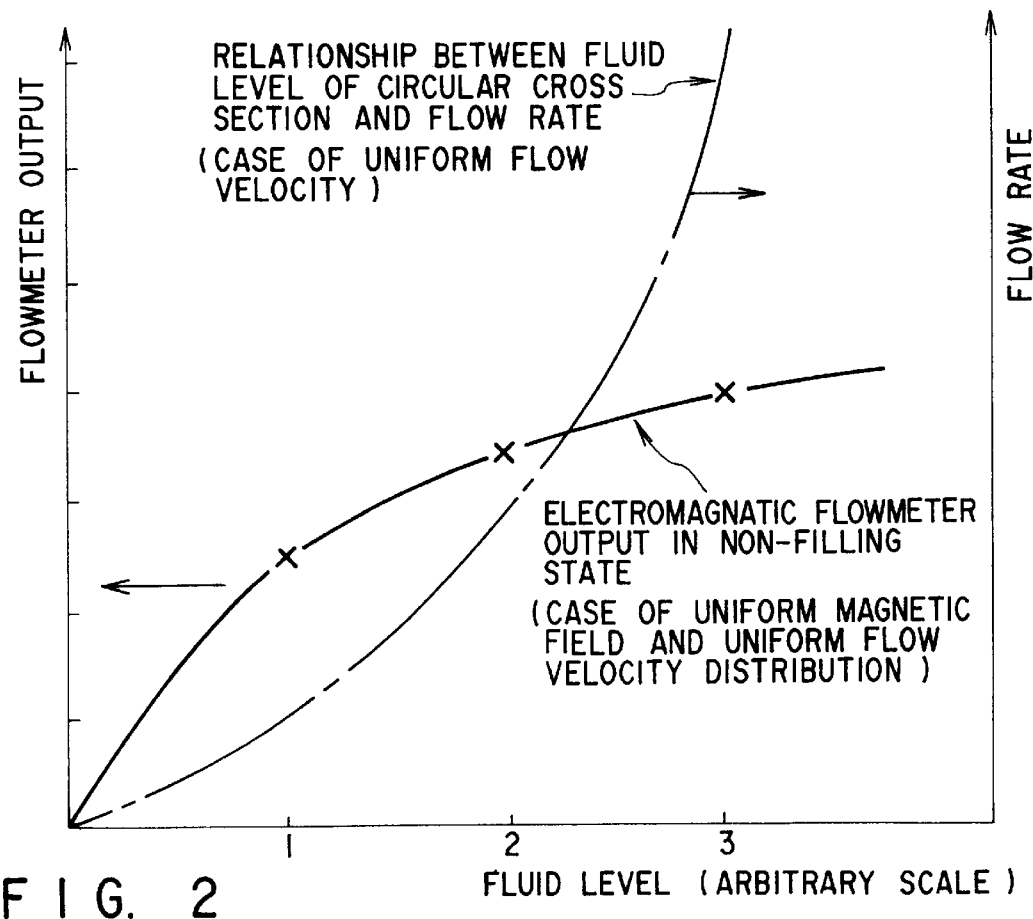
FIG. 2 is a view showing dependence on a fluid level in an electromagnetic flowmeter calculated using the network model of FIG. 1.

In the network model, electromotive force is added to upper and lower branches. FIG. 2 is a view showing a calculation result of dependence of electromotive force on a fluid level using the network model.

In the calculation of dependence on the fluid level in electromotive force, the flow velocity and magnetic flux density are fixed at any portion of the flow tube. As shown in the figure, the higher a fluid level becomes, the smaller an output change rate becomes. It can be confirmed that sensitivity of the flowmeter is deteriorated.

The above result will be qualitatively explained as follows:

Regarding electromotive force generated in the respective fluid elements, a potential distribution is determined on the basis of the earth electrode provided at the end portion of the measuring tube. If the fluid level is low, an impedance value from a plus polarity of electromotive force 52 to the earth electrode is substantially equal to an impedance value from the earth electrode to a minus polarity of electromotive force 52 through the point electrode. Also, their symmetry is extremely good.

The point electrode is placed in the vicinity of the minus polarity of electromotive force 52, and an output having a high level can be obtained as an inter-electrode output. However, regarding electromotive force generated in the fluid elements close to the fluid level, if the fluid level is increased, impedance directing from the earth electrode to the minus polarity of electromotive force through the point electrode is higher than the other impedance. The potential of the point electrode is divided between the earth electrode and the minus polarity of electromotive force, and the output level becomes small. As a result, it can be considered that sensitivity of the output of inter-electrode electromotive force is deteriorated according as the level increases.

An output characteristic of the electromagnetic flowmeter is not simply determined by only a cross sectional shape of the measuring tube. As shown in the above simulation, inter-electrode electromotive force is determined by three-dimensional arrangement and shape of the electrodes, and the shape of the measuring tube.

In the electromagnetic flowmeter of the embodiment of the present invention, the earth electrode positioned at the end portion of the measuring tube is used as a measuring electrode. Due to this, an inter-electrode output characteristic depends on the total amount of electromotive force in fluid contained between the electrodes. The electromagnetic flowmeter of the present invention is strongly influenced with fluid expanding in the axial direction of the measuring tube as compared with the general electromagnetic flowmeter.

The following will explain the electromagnetic flowmeter of each of the embodiments of the present invention with reference to the drawings.

<First embodiment>

In the electromagnetic flowmeter of this embodiment, a position of a magnetic filed coil to be formed on a measuring tube is changed. Thereby, a distribution of magnetic flux is varied so as to is correct dependence on a fluid level in the electromagnetic flowmeter.

An inter-electrode output of the electromagnetic flowmeter is obtained as an integral calculus of the product of a weight function, a distribution of flow velocity, and a distribution of magnetic flux density. A characteristic in which output sensitivity is reduced according as the level becomes high is corrected.

Due to this, an output characteristic is improved by increasing magnetic flux density at a location having a high fluid level.

However, in actual, the distribution of magnetic flux must be determined as considering influence of the weight function upon each portion, in addition to increase in magnetic flux density at the location having a high fluid level.

FIG. 3 is a schematic view showing the structure of the electromagnetic flowmeter of the first embodiment of the present invention.

In FIG. 3, reference numeral 1 is a measuring tube. The measuring tube is formed by providing an insulation layer on its inner surface. Or, the measuring tube itself is formed of an insulation material. Reference numeral 9 shows a level of fluid flowing in the measuring tube 1.

A point electrode 2 is formed on a lower portion of the measuring tube 1. The point electrode 2 detects electromotive force generated in fluid flowing in the measuring tube 1. An excitation coils 3 are formed on both side walls of the measuring tube 1. The excitation coils 3 generate magnetic flux in the measuring tube 1.

An opening angle of each of the coils, which is seen from the center of the measuring tube 1, is set to be within 80° to 100° to lessen influence upon an output caused by a difference in the weight function.

To increase the magnetic flux density at the high fluid level, the excitation coils 3 are arranged as follows.

More specifically, the excitation coils 3 are arranged at the side of the measuring tube 1 such that the center of each coil 3 is shifted by θ from a horizontal axis of the measuring tube 1. In this case, the opening angle of each coil is maintained.

An excitation circuit 4 is electrically connected to the coils 3. The excitation 4 outputs an excitation current such as a square wave, a sine wave, etc., to the coils 3. Thereby, the coils 3 generate a magnetic field in the measuring tube 1 so as to be perpendicular to an axial direction of the measuring tube and perpendicular to a gravitational direction, and not influenced by a fluid level therein.

Also, as shown in FIG. 4, an earth ring 5 is formed on both ends of the measuring tube 1 to contact conductive fluid. The earth ring 5 serves as one electrode function.

An earth potential line of each of the point electrode 21 and the earth ring 5 is electrically connected to an input side of a differential amplifier 13. An input side of a noise removing circuit 6 is electrically connected to an output side of the differential amplifier 13.

Also, an output side of the noise removing circuit 6 is electrically connected to an input side of an signal processing section 14. The signal processing section 14 calculates a flow rate of fluid flowing in the measuring tube 1. A display section 15 is connected to an output side of the signal processing section 14. The display section 15 displays the flow rate calculated by the signal processing section 14.

It is noted that a feedback path, which comprises a core for efficiently generating the magnetic flux from the excitation coils 3 and a case, is not directly related to the feature of the present invention. Due to this, the explanation will be omitted.

An operation of the above-structured electromagnetic flowmeter will be explained as follows.

For detecting the flow rate of fluid flowing in the measuring tube 1, the excitation circuit 4 is driven to add the excitation current to the excitation coils 3. Thereby, the magnetic filed is generated in the measuring tube 1.

As mentioned above, the excitation coils 3 are arranged at the side of the measuring tube 1 such that the center of each coil 3 is shifted by θ from the horizontal axis of the measuring tube 1. Due to this, the magnetic flux density at the high fluid level is increased, so that dependence of the flowmeter on the level can be corrected even if fluid flowing in the measuring tube 1 is in the non-filling state.

If the magnetic field is generated in the measuring tube 1 by the excitation coils 3, electromotive force, which is generated by fluid flowing in the measuring tube, is detected by the point electrode 2. Then, an output from the point electrode 2 is input to the differential amplifier 13. The differential amplifier 13 amplifies a difference between a voltage of the signal output from the point electrode 2 and a voltage of the earth ring 5. Then, the differential amplifier 13 outputs an differential amplifier signal to the noise removing circuit 6.

The noise removing circuit 6 removes noise of the signal output from the differential amplifier 13. In other words, noise of the signal, which is proportional to the flow rate of fluid flowing in the measuring tube 1, is removed. Then, the signal is output to the signal processing section 14.

The signal processing section 14 provides a signal process to the signal to calculate a flow rate output. Then, the calculated flow rate output is output to the display section 15. The display section 15 displays the flow rate of fluid flowing in the measuring tube 1 based on the flow rate output from the signal processing section 14.

According to the electromagnetic flowmeter of this embodiment, the excitation coils 3 are placed at the position higher than the central position of the measuring tube 1. Thereby, the magnetic flux density at the high fluid level is increased. As a result, dependence on the fluid level can be improved, and fluid flowing in the measuring tube 1 in the non-filling state can be correctly measured.

If a length between the earth electrode and the point electrode 2, is one to twice as large as an inner diameter of the measuring tube 1, the center of each excitation coil 3 is positioned as follows. In this case, the point electrode 2 is attached to the lower portion of the central portion of the measuring tube 1.

Specifically, the center of each coil 3 is shifted by 5° to 20° from the horizontal axis of the measuring tube 1.

Thereby, dependence on the fluid level in the electromagnetic flowmeter can be reduced.

Also, if an axial length of each excitation coil 3 is long, and a distance between the earth electrode 5 and the point electrode 2 becomes longer, the central angle of each coil 3 shifted from the horizontal axis of the measuring tube 1 may be small.

In the above-explained embodiment, the earth ring 5 was formed on both ends of the measuring tube 1. However, the earth ring 5 may be formed on one end of the measuring tube 1.

<Second Embodiment>

The following will explain the electromagnetic flowmeter of the second embodiment.

As is obvious from the above-mentioned simulation, the characteristic of dependence on the fluid level in the inter-electrode output has a considerably large non-linearity. In this embodiment, a fluid level measuring circuit for detecting a fluid level is provided to correct the difference between the electrodes in the output, and to obtain a flow rate signal having high accuracy.

FIG. 5 is a schematic view showing the structure of the electromagnetic flowmeter of the second embodiment of the present invention. The same reference numerals as FIG. 3 are added to the portions common to FIG. 3.

As shown in FIG. 5, in the electromagnetic flowmeter of this embodiment, there is formed an electrode 11 for detecting a fluid level. The electrode 11 is placed at a position having a height, which is different from the height of the point electrode 2.

A fluid level measuring circuit (impedance measuring circuit) 12 is electrically connected to the electrode 11. The impedance measuring circuit 12 measures electromotive force generated between the electrode 11 and the earth electrode. Thereby, impedance Zl of the fluid level can be obtained.

The signal processing section 14 is connected to an output side of the impedance measuring circuit 12. The signal processing section 14 outputs a flow rate signal S having high accuracy based on data (impedance Zl) of the fluid level output from the impedance measuring circuit 12.

More specifically, the signal processing section 14 continuously measures a fluid level L from impedance Zl measured by the impedance measuring circuit 12. Then, the signal processing section 14 performs a calculation for correction (equation (5) shown below) based on an output S' between the point electrode and the earth electrode, and the fluid level L. In this case, the output S' is a value obtained by amplifying a potential between the output potential output of the point electrode 2, which is output from the amplifier 13, and the earth electrode. Then, a flow rate signal S proportional to the flow rate Q having high accuracy is calculated so as to be output to the display 15.

$$S = g (L, S') \quad (5)$$

In this case, a function g is an inverse transform function of a characteristic function f among inter-electrode output S', fluid level L, and flow rate Q shown in FIG. 6. Actually, the function g may be a function, which is continuously approximated, a function, which is divisionally approximated, or a translate table, which is divisionally given by a numeral.

The characteristic is determined by shapes of the electrode and the excitation coils 3 and the position of the excitation coils 3. Due to this, a measurement can be performed once on trial. The characteristic function can be, of course, obtained from structural data by a numeral calculation.

Then, the display 15 displays the flow rate of fluid flowing in the measuring tube 1 based on the flow rate signal S output from the signal process section 14.

According to the flowmeter of this embodiment, the calculation for correcting the output S' obtained from the inter-electrode output, is performed based on the fluid level. Thereby, the flow rate signal S having high accuracy can be obtained, and the flow rate of fluid Q flowing in the measuring tube in the non-filling state can be correctly measured.

<Third Embodiment>

The following will explain the electromagnetic flowmeter of the third embodiment.

In the electromagnetic flowmeter of the first embodiment, the position of each excitation coil 3 was shifted to intensify magnetic flux density at the high fluid level. In the third embodiment, the other excitation coils are provided in addition to the excitation coils. The other excitation coils are driven in accordance with the fluid level so as to intensify magnetic flux density at the high fluid level, and to correct dependence on the fluid level.

Figure 7:
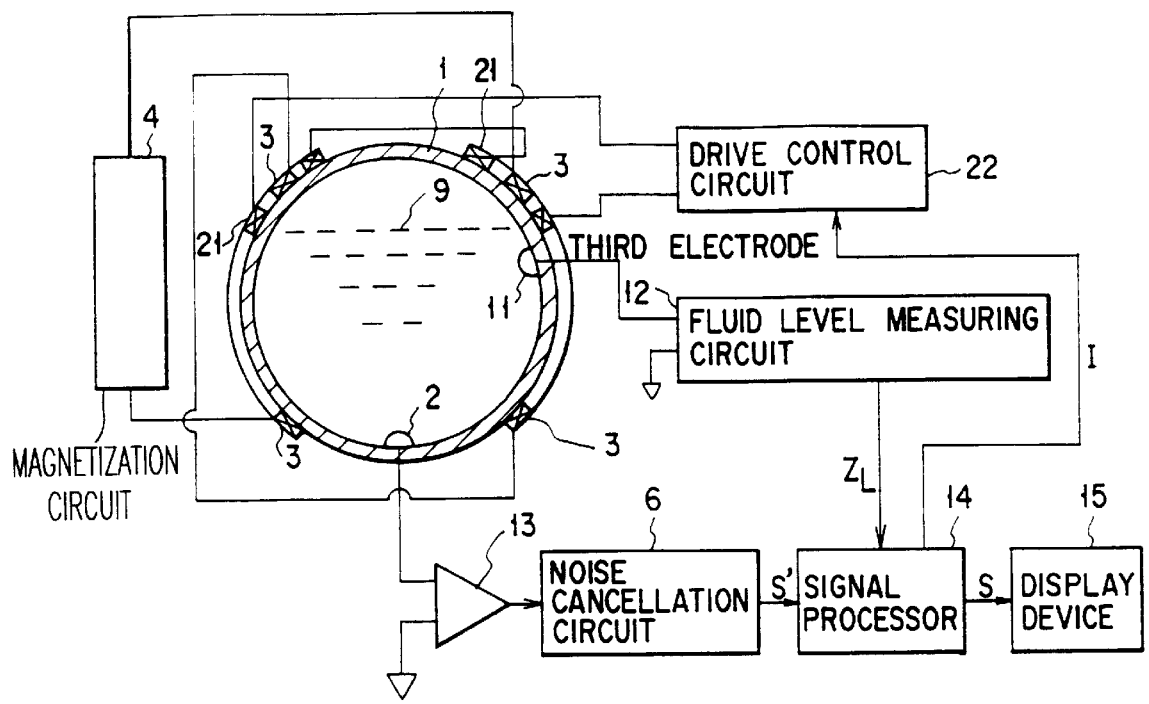
FIG. 7 is a schematic view showing the structure of an electromagnetic flowmeter of a third embodiment of the present invention.

FIG. 7 is a schematic view showing the structure of the electromagnetic flowmeter of the third embodiment of the present invention. The same reference numerals as FIG. 4 are added to the portions common to FIG. 4.

As shown in FIG. 7, the feature of the electromagnetic flowmeter of this embodiment lies in that excitation coils 21 are provided at the upper portions of the measuring tube 1 in addition the coils 3. A drive control circuit 22 is electrically connected to the excitation coils 21. The drive control circuit 22 drives the excitation coils 21 based on a drive signal output from the signal processing section 14.

The following will explain a method of calculating the drive signal output to the drive control circuit 22 from the signal processing section 14.

As explained in the second embodiment, the signal processing section 14 calculates the fluid level L based on impedance Zl output from the impedance measuring circuit 12.

Next, as shown in equation (6) shown below, the signal process section 14 calculates a drive signal I of the excitation coils 21 based on the calculated fluid level L and the predetermined characteristic function $g_1$. Then, the calculated drive signal I is output to the drive control circuit 22.

$$I = g_1, (L) \quad (6)$$

More specifically, if the fluid level is high, the amount of the signals to the citation coils 21 is increased, and the magnetic flux density at the high fluid level is relatively intensified. Thereby, sensitivity of the electromagnetic flowmeter is improved, and the output characteristic can be corrected.

A current to the excitation coils 21 using the drive signal I (drive current) is on/off-controlled. Moreover, the excitation coils 21 are driven in a direction where the magnetic flux density of the excitation coils 3 is reduced. Thereby, the magnetic flux density at the relatively high fluid level can be improved.

As mentioned above, the excitation coils 21 are driven so as to change the distribution of the magnetic flux of the measuring tube, and to improve the error caused by the fluid level.

Therefore, according to the electromagnetic flowmeter of this embodiment, the flow rate signal having high accuracy can be obtained.

Then, the signal process section 14 calculates the flow rate signal S having high accuracy based on the output S', which is proportional to the flow rate output from the amplifier 13. The calculated flow rate signal is output to the display 15.

The display 15 displays the flow rate of fluid flowing in the measuring tube 1 based on the flow rate signal S output from the signal processing section 14.

Therefore, according to the electromagnetic flowmeter of this embodiment, the magnetic flux density at the high fluid level can be improved, so that dependence on fluid level can be removed. Due to this, the flow rate of fluid flowing in the measuring tube 1 can be correctly measured.

<Fourth embodiment>

The following will explain the electromagnetic flowmeter of the fourth embodiment.

The feature of the electromagnetic flowmeter of this embodiment lies in the following points.

Specifically, a plurality of point electrodes is axially provided on the lower portion of the measuring tube 1. Then, an output from each of these electrodes is changed in accordance with the fluid level.

Figure 8:
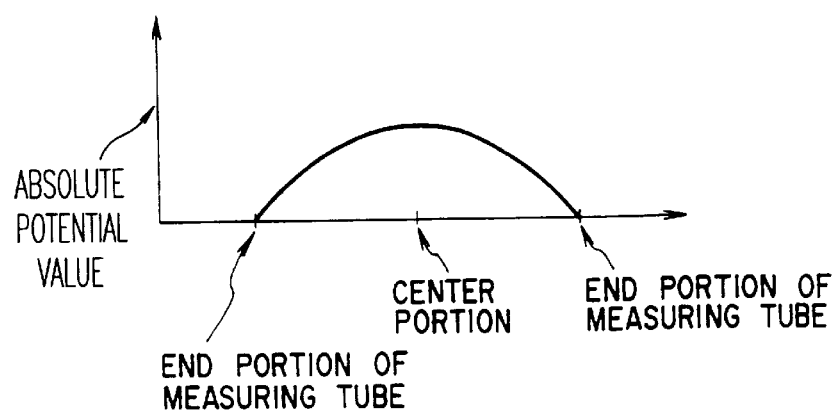
FIG. 8 is a view showing a potential distribution of a lower portion of the measuring tube in its axial direction.

FIG. 8 shows a potential distribution of the lower portion of the measuring tube in its axial direction. As shown in this figure, the highest potential generated at the central portion of the measuring tube 1 can be obtained. According as the position comes close to the end portion of the measuring tube, the potential and the output sensitivity reduce.

Figure 9:
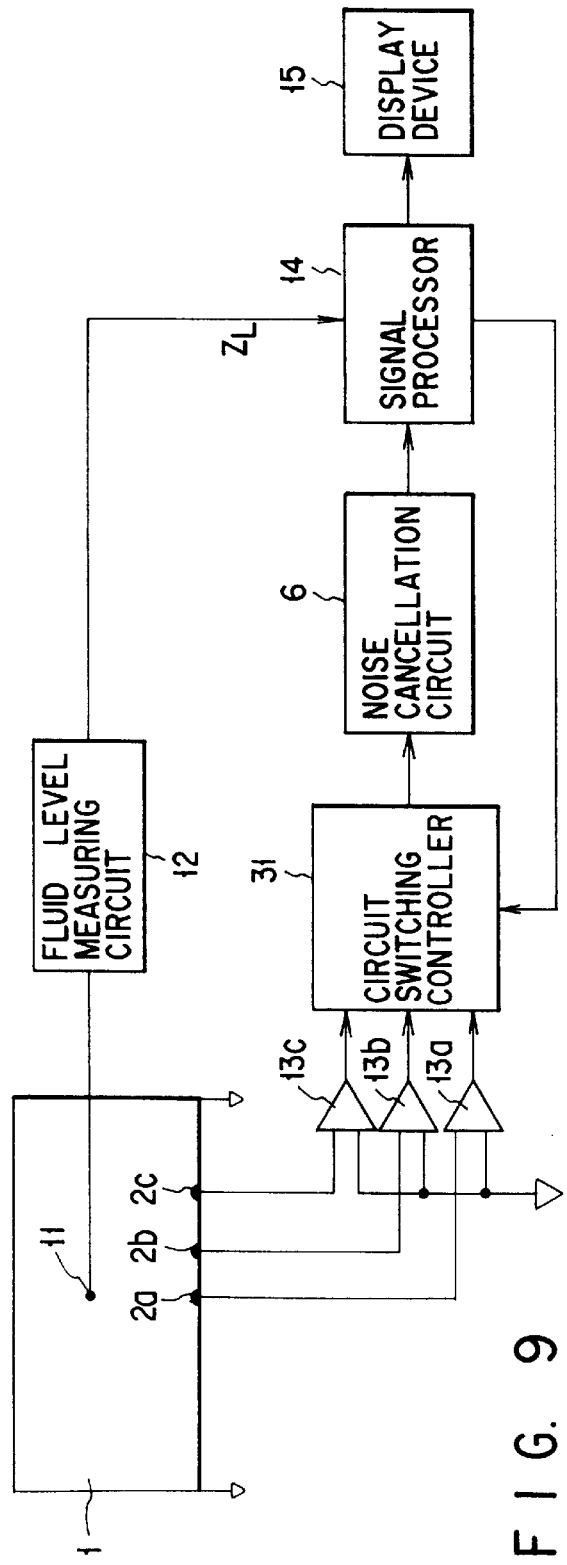
FIG. 9 is a schematic view showing the structure of an electromagnetic flowmeter of a fourth embodiment of the present invention.

FIG. 9 is a schematic view showing the structure of the electromagnetic flowmeter of the fourth embodiment of the present invention. The same reference numerals as FIG. 4 are added to the portions common to FIG. 7. Also, it is assumed that the excitation coils and the magnetic circuit are provided as shown in FIG. 5.

As shown in FIG. 9, point electrodes 2a to 2c are axially provided on the lower portion of the measuring tube 1. These point electrodes 2a to 2c are connected to amplifiers 13a to 13c, respectively. These amplifiers 13a to 13c amplify electromotive force generated between an output potential from each of the electrodes 2a to 2c and the earth electrode.

A circuit switching control section 31 is connected to these amplifiers 13a to 13c in common. If the fluid level L calculated by the signal processing section 14 is lower than a predetermined first fluid level, the circuit switching control section 31 operates as follows.

Specifically, the circuit switching control section 31 selects a signal output from the point electrode 2c, which is closest to the end portion, so as to be output.

If the fluid level L is lower than a predetermined second fluid level, the circuit switching control section 31 operates as follows.

Specifically, the circuit switching control section 31 selects a signal output from the point electrode 2a, which is positioned at the center of the measuring tube 1, so as to be output.

Moreover, if the fluid level L is placed between the first and second levels, the circuit switching control section 31 selects a signal output from the point electrode 2b to be output.

Then, as mentioned in the first embodiment, the signal process section 14 performs a calculation for correction based on the output S' and the fluid level L. In this case, the output S' is output from the circuit switching control section 31 through the noise removing circuit 6, and is proportional to the flow rate output from the selected amplifier. The fluid level L is calculated based on impedance Zl output from the impedance measuring circuit 12. As a result of the calculation for correction, the signal processing section 14 calculates the flow rate signal S having high accuracy so as to be output to the display 15.

In the above embodiment, the outputs of the amplifiers 13a to 13c were switched by the circuit switching control circuit 31, respectively, so as to obtain the flow rate signal. However, it is possible to add all outputs from the amplifiers 13a to 13c so as to obtain the flow rate signal from the added signals.

According to the electromagnetic flowmeter of this embodiment, the points electrodes 2a to 2c are switched by the circuit switching control circuit 31 in accordance with the level so as to correct the flow rate signal. Thereby, the flow rate signal having high accuracy is calculated.

<Fifth Embodiment>

The following will explain the electromagnetic flowmeter of the fifth embodiment.

The feature of the electromagnetic flowmeter of this embodiment lies in the following points.

Specifically, at least one or more point electrodes are attached to a cross section including the point electrode attached to the lower portion of the measuring tube 1. Then, electromotive force generated between the point electrode attached to the lower portion and the electrode attached to the cross section is measured so as to be calculated as a flow rate signal.

Figure 10:
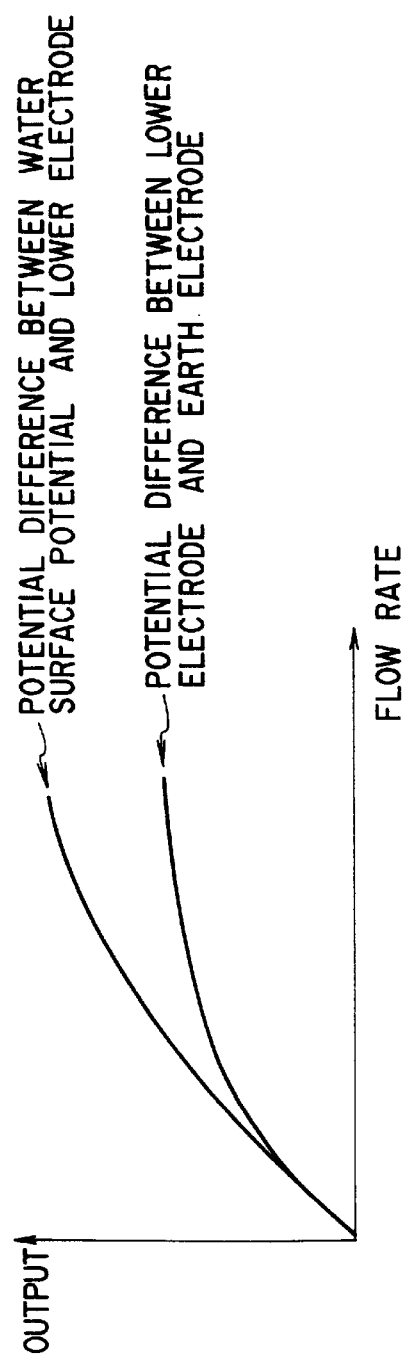
FIG. 10 is a view showing a potential difference between a water surface potential and a lower electrode, and a potential difference between the lower electrode and an earth electrode.

FIG. 10 is a view showing a potential difference between a water surface potential and a lower electrode, and a potential difference between the lower electrode and an earth electrode.

As is obvious from FIG. 10, regarding dependence on the fluid level, electromotive force (electromotive force), which is generated between the water surface potential and the lower electrode, is improved. In other words, electromotive force shown in FIG. 10 is improved as compared with electromotive force generated between the earth electrode of the end portion of the measuring tube and the point electrode of the lower portion.

Figure 11:
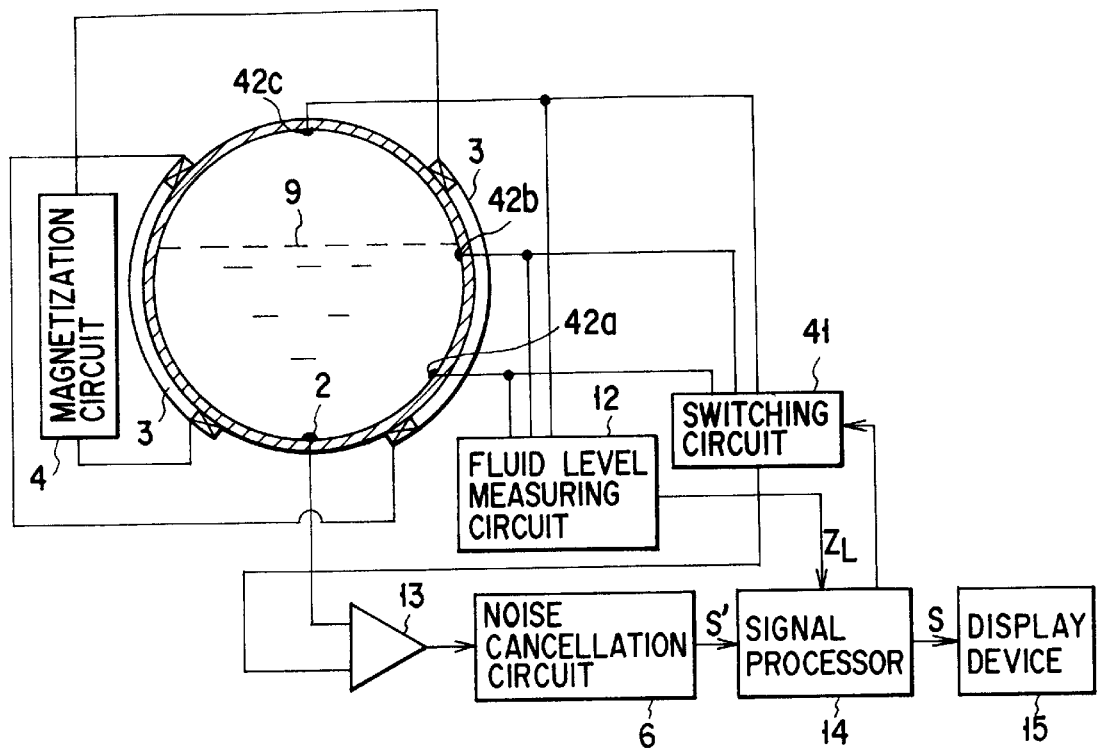
FIG. 11 is a schematic view showing the structure of an electromagnetic flowmeter of a fifth embodiment of the present invention.
Figure 12:
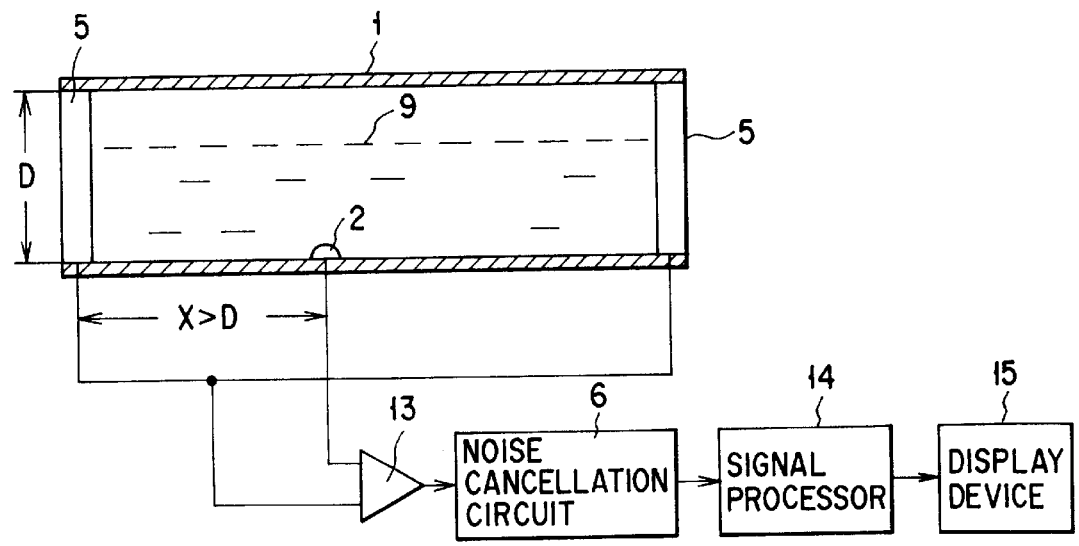
FIG. 12 is a schematic view showing the structure of an electromagnetic flowmeter of a sixth embodiment of the present invention.

FIG. 11 is a schematic view showing the structure of the electromagnetic flowmeter of the fifth embodiment of the present invention. The same reference numerals as FIG. 4 are added to the portions common to FIG. 4.

As shown in FIG. 11, three point electrodes 42a to 42c are attached to the cross section including the point electrode attached to the lower portion of the measuring tube 1. A switching circuit 41 is connected to these point electrodes 42a to 42c in common.

The impedance measuring circuit 12 outputs impedance Zl of a fluid level based on an output from each of the point electrodes 42a to 42c.

A switch circuit 41 selects an output of the electrode closest to the water surface among the electrodes 42a to 42c based on a switch signal output from the signal processing section 14. Then, the switch circuit 41 sends the selected output to the amplifier 13.

The point electrode is selected by the switch signal output from the signal processing section 14. The switch signal is determined based on the fluid level L of the measuring tube 1, which is calculated based on impedance Zl output from the impedance measuring circuit 12.

More specifically, if fluid flows in the measuring tube 1 in the filling state, the point electrode 42c is selected. If fluid flows in the measuring tube 1 in a state as shown in FIG. 11, the point electrode 42b is selected.

However, if the fluid level cannot be correctly measured by the reason of a case in which the point electrode is positioned close to a fluid surface, the other point electrode is selected. The other point electrode is positioned at the low fluid level side.

The amplifier 13 amplifies the difference between the output of the lower electrode 2 and an output sent from any of these electrodes 42a to 42c through the switching circuit 41. Then, the resultant signal is output to the noise removing circuit 6 as a flow rate signal S'.

The noise removing circuit 6 removes noise of the flow rate signal S' output from the amplifier 13. Thereafter, the flow rate signal S' is output to the signal processing section 14. Then, the signal processing section 14 performs a calculation for correction based on the output from the amplifier 13, that is, the output S', which is proportional to the flow rate, and the fluid level L, as mentioned in the second embodiment. Thereby, the flow rate signal S having high accuracy is calculated so as to be output to the display 15.

The display 15 displays the flow rate of fluid flowing in the measuring tube 1 based on the flow rate signal S output from the signal processing section 14.

In the above embodiment, the outputs of the point electrodes 42a to 42c were switched by the switching circuit 41, respectively, so as to obtain the flow rate signal. However, it is possible to add all outputs from the point electrodes 42a to 42c so as to obtain the flow rate signal from the added signals.

According to the electromagnetic flowmeter of this embodiment, the points electrodes 42a to 42c are switched by the switching circuit 41 in accordance with the fluid level so as to correct the flow rate signal. Thereby, the flow rate signal having high accuracy is calculated.

<Sixth embodiment>

The following will explain the electromagnetic flowmeter of the fifth embodiment. Since the same reference numerals as FIG. 4 are added to the portions common to FIG. 4, the explanation will be omitted. Also, it is assumed that the excitation coils and the magnetic circuit are provided as shown in FIG. 3.

The reason the flow rate signal has dependence on fluid level is as follows.

Specifically, electromotive force (electromotive force) at the respective fluid elements is partially divided at a current loop including the earth electrode, serving as a reference potential, provided at the end portion of the measuring tube, and the point electrode.

Therefore, if the distance between the point electrode and the earth electrode is sufficiently long against the fluid level, reduction of sensitivity due to the partial division of electromotive force at the fluid element positioned at the high level can be small.

In the electromagnetic flowmeter of this embodiment, a distance X between the earth electrode 5 and the point electrode 2 is set to be larger than an inner diameter D of the measuring tube (X>D).

Thereby, electromotive force having a sufficient value output from the fluid element at the high level can be also detected. Moreover, the flow rate signal having small dependence on the fluid level and high accuracy can be obtained.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An electromagnetic flowmeter comprising:

magnetic field generation means for generating a magnetic field in a measuring tube, said magnetic field being perpendicular to an axial direction of said measuring tube and perpendicular to a gravitation direction, such that electromotive force generated in a fluid in said measuring tube is not influenced by a fluid level of said fluid; and flow rate output mans for calculating flow rate of fluid flowing in said measuring tube based on a potential developed in said fluid by said magnetic field generated by said magnetic field generation means so as to output said calculated flow rate and;

display means for displaying said flow rate calculated by said flow rate output means.

2. An electromagnetic flowmeter comprising:

magnetic field generation means for generating a magnetic field in a measuring tube, said magnetic field being perpendicular to an axial direction of said measuring tube and to be perpendicular to a gravitation direction such that an electromotive force generated in a fluid flowing in said measuring tube is not influenced by a fluid level of said fluid;

flow rate output means for calculating a flow rate of said fluid flowing in said measuring tube based on a potential developed in said fluid by said magnetic field generated by said magnetic field generation means so as to output said calculated flow rate; and display means for displaying said flow rate calculated by said flow rate output means, wherein said magnetic field generation means comprises:

a pair of excitation coils provided on an outer periphery of said measuring tube; and supply means for supplying an excitation current to each of said excitation coils to generate the magnetic field;

wherein said excitation coils are arranged such that a line connecting to a center of each of said excitation coils is placed on an upper side in the gravitation direction with respect to a line which passes through the center of the measuring tube parallel to the axial direction of the measuring tube and perpendicular to the gravitation direction.

3. The electromagnetic flowmeter according to claim 1, wherein said magnetic field generation means comprises:

first magnetic field generation means for generating the magnetic field in said measuring tube to be perpendicular to the axial direction of said measuring tube;

detection means for detecting level of fluid flowing in said measuring tube;

drive current output means for outputting a drive current for generating a magnetic field such that electromotive force generated in said fluid is not influenced by said fluid level based on the fluid level detected by said detection means; and second magnetic field generation means for generating a magnetic field for correcting the magnetic field generated in the measuring tube to be perpendicular to an axial direction of said measuring tube such that electromotive force generated in said fluid is not influenced by said fluid level based on said drive current output from said drive current output means.

4. An electromagnetic flowmeter comprising:

magnetic field generation means for generating a magnetic field that is both perpendicular to an axial direction of said measuring tube and perpendicular to a gravitation direction in a measuring tube; and flow rate output means for calculating a flow rate of fluid flowing in said measuring tube based on a potential developed in said fluid by the magnetic field generated by said magnetic field generation means and said level of fluid flowing in said measuring tube so as to output said calculated flow rate; and display means for displaying said flow rate calculated by said flow rate output means.

5. The electromagnetic flowmeter according to claim 4, wherein said flow rate output means comprises:

detection means for detecting the level of fluid flowing in said measuring tube;

calculation means for calculating the flow rate of fluid flowing in said measuring tube based on the potential developed in said fluid by the magnetic field generated by said magnetic generation means; and correction flow rate output means for correcting the flow rate of fluid calculated by said calculation means based on the fluid level detected by said detection means so as to output said corrected flow rate to said display means.

6. The electromagnetic flowmeter according to claim 4, wherein said flow rate output means comprises:

fluid level detection means for detecting the level of fluid flowing in said measuring tube;

a plurality of flow rate detection means for outputting signals, which are proportional to the flow rate of fluid flowing in said measuring tube, based on electromotive force generated at a position in an axial direction of a lower portion of said measuring tube, respectively;

flow rate selection means for selecting a signal, which is output from said flow rate detection means corresponding to said fluid level and proportional to the flow rate, among the signals, which are output from said flow rate detection means and proportional to the flow rate, based on the fluid level detected by said fluid level detection means; and correction flow rate output means for calculating the flow rate of fluid flowing in said measuring tube based on the signal output from said flow rate selection means so as to correct the calculated flow rate of fluid based on the fluid level detected by said fluid level detection means and to output said corrected flow rate to said display means.

7. The electromagnetic flowmeter according to claim 4, wherein said flow rate output means comprises:

a plurality of potential detection means for detecting a potential of each of a plurality of positions of said measuring tube;

fluid level detection means for detecting the fluid level flowing in said measuring tube based on the potential detected by said potential detection means;

selection means for selecting one of potentials output from said plurality of potential detection means so as to be output based on the fluid level detected by said fluid level detection means;

lower portion potential detection means for detecting a potential of a lower portion of said measuring tube; and correction flow rate output means for calculating the flow rate of fluid flowing in said measuring tube based on the potential detected by said lower portion potential detection means and the potential output from said selection means so as to correct said calculated flow rate of fluid based on the fluid level detected by said fluid level detection means and to output said corrected flow rate to said display means.

8. An electromagnetic flowmeter comprising:

an earth ring, provided at an end portion of a measuring tube, for indicating an earth potential;

magnetic field generation means for generating a magnetic field in said measuring tube to be perpendicular to an axial direction of said measuring tube and to be perpendicular to a gravitation direction; and flow rate output means for calculating a flow rate of fluid flowing in said measuring tube based on a potential, which is developed at a lower portion of said measuring tube and which is detected at a portion of said measuring tube separated from said earth ring by a distance more than an inner diameter of said measuring tube, said potential developed by said magnetic field generated by the magnetic field generation means and the earth potential indicated by said earth ring; and display means for displaying said flow rate calculated by said flow rate output means.

9. An electromagnetic flowmeter comprising:

a pair of excitation coils, provided on an outer periphery of a measuring tube, for generating a magnetic field in said measuring tube, said magnetic fluid being perpendicular to an axial direction of said measuring tube and perpendicular to a gravitational direction, such that an electromotive force generated in a fluid in said measuring tube is not influenced by a fluid level of said fluid;

a point electrode, provided at a lower portion in said measuring tube, for detecting a potential developed in said fluid by said magnetic field generated by said pair of excitation coils;

a processor for calculating a flow rate of fluid flowing in said measuring tube based on the potential detected by said point electrode; and a display device for displaying said flow rate calculated by said processor.

* * * * *